US005674002A

United States Patent [19]

Powell et al.

[11] Patent Number: 5,674,002

[45] Date of Patent: Oct. 7, 1997

[54] HAMMERS WITH OPTIMAL CLAW SHAPE AND METHOD FOR DEVELOPMENT OF OPTIMALLY DESIGNED HAMMERS, CROWBARS, AND LEVERS

[76] Inventors: Talmadge Wayne Powell, 218 Vetavia St., Irondale, Ala. 35210; Evangelos C. Eleftheriou, 3528 William and Mary Rd., Birmingham, Ala. 35216

[21] Appl. No.: 562,689

[22] Filed: Nov. 27, 1995

[51] Int. Cl.$^{6}$ .................................................... G05B 13/02

[52] U.S. Cl. ............... 364/148; 364/474.15; 364/474.24; 254/26 R

[58] Field of Search ............................... 81/20; 254/26 E, 254/26 R; 76/103; 364/148 (U.S. only), 474.01 (U.S. only), 474.15, 474.24

[56] References Cited

U.S. PATENT DOCUMENTS

| | | | |
|---|---|---|---|
| 210,041 | 11/1878 | Knauer | 254/26 R |
| 671,821 | 4/1901 | Gagnon | 254/26 R |
| 785,921 | 3/1905 | Springer | 254/26 R |
| 1,117,465 | 11/1914 | West | 254/26 R |
| 1,792,437 | 2/1931 | Metzger et al. | 254/26 R |
| 2,557,045 | 6/1951 | Baker | 254/26 R |
| 2,576,243 | 11/1951 | Stevens | 254/26 R |
| 4,290,583 | 9/1981 | Lombardi | 81/20 |
| 4,482,132 | 11/1984 | Lamansky | 254/26 R |
| 4,792,889 | 12/1988 | Kragelin et al. | 364/474.24 |
| 4,975,827 | 12/1990 | Yonezawa | 264/148 |
| 5,185,855 | 2/1993 | Kato et al. | 364/474.24 |
| 5,195,026 | 3/1993 | Nonaka et al. | 364/148 |
| 5,237,647 | 8/1993 | Roberts et al. | 395/119 |
| 5,253,189 | 10/1993 | Kramer | 364/578 |
| 5,431,562 | 7/1995 | Andreiko et al. | 433/24 |
| 5,510,995 | 4/1996 | Oliver | 364/474.24 |

FOREIGN PATENT DOCUMENTS

| | | | |
|---|---|---|---|
| 135131 | 11/1919 | United Kingdom | 254/26 R |

*Primary Examiner*—Robert C. Watson
*Assistant Examiner*—Thomas W. Lynch

[57] ABSTRACT

A hammer-head comprising an optimally designed set of nail extraction claws oriented at a predetermined tangency angle relative to an integrally mounted anvil. The hammer-head is to be used with an integral or removable handle to minimize the forces required in extraction of nails and in exercising prying forces by such tools as a common hammer, a crowbar, or a lever with a stationary or movable fulcrum point. An optimization methodology based on minimization of the nail extraction energy or minimization of the nail extraction energy is implemented in a design methodology and an algorithm for the synthesis of the optimal contour shape of the claws. Boundary conditions, constraints, constitutive models, and governing equations for this design methodology are derived from the length of nails and the engagement conditions between the nail, the board, and the hammer, and the outcome facilitates the design of a single optimum claw contour for extraction of a range of nail sizes, or a family of claw contours for the extraction of varying ranges of nails.

5 Claims, 6 Drawing Sheets

HAMMERS WITH OPTIMAL CLAW SHAPE AND METHOD FOR DEVELOPMENT OF OPTIMALLY DESIGNED HAMMERS, CROWBARS, AND LEVERS

BACKGROUND

1. Field of Invention

The present invention relates to hand-tools, and more particularly to hammers, craw bars, and levers. In even greater particularity, the present invention relates to a hand-powered tool being used for extraction of nails and application of vertical forces.

2. Description of Prior Art

A hammer is one of the oldest hand-tools known to man. Through the centuries since its inception it has been used for carving stone or wood, for daily agricultural tasks, for carpentry, and for construction work. Nowadays it is mostly used to perform three manual tasks: to drive nails, to extract nails, and to tear boards.

Two of the current uses of hammers require contradicting design characteristics. Tearing boards requires lengthy and straight claws while extracting nails requires contoured claws. This contradiction brought about the design and manufacture of hammers which are specifically designed for tearing, and hammers which are more suitable for extraction of nails. Several products on the market are classified as tearing hammers and others are classified as claw hammers for nail extraction. Some manufacturers of board tearing hammers are: Stanley (Mechanics Tool Division), Cooper Group, Vaughan and Bushnell Manufacturing Company, East Wing Manufacturing Company, and Handtool Company. Some manufacturers of claw hammers are: K. C. Professionals, Stanley (Mechanics Tool Division), Cooper Group, and Handtool Company.

Existing claw hammers on the market have varying contour shapes and the forces they require for extraction of identical nails vary drastically. In addition, the length of nails which can be extracted by each of these hammers is variable and dependent on the shape of their claw contours.

To enhance the nail extraction capability of claw hammers, inventors concentrated their efforts on the modification of the common hammer through the addition of various extensions, peripheral attachments, and other devices. For example, U.S. Pat. No. 493,989 to Edwin G. Duryka provided for a secondary claw which would be helpful in completely extracting nails which are partially pulled.

U.S. Pat. No. 540,967 to Clarence M. Eveleth claimed that the presence of a plunger moving inside the handle would provide adjustable fulcrum and a means of support. The height of the movable plunger was varied and secured by a spring-loaded trigger mechanism which penetrated notches forged on the plunger. A similar force application mechanism was implemented on the hammer described in the U.S. Pat. No. 619,325 to Orlando E. Martin. In his case the plunger was spring-loaded and made use of slanted notches much like the ones on today's ratchet mechanisms.

U.S. Pat. No. 795,876 to Martin H. Willhide claimed an improved claw type which extended in two directions. The tool was intended for exclusive use as a nail puller and not a hammer with an integral anvil. Each of the two claws possessed a different curvature. The claw with the small radius of curvature was meant for initial engagement with the nail, while the opposite side was intended for complete extraction. The tool also provided a customized double handle.

U.S. Pat. No. 785,921 to Sammuel Springer provides for a custom manufactured anvil head and the addition of a protruding fulcrum insert. This insert is at a fixed location and is a completely independent component.

The principles claimed in U.S. Pat. No. 795,876 were more specifically applied to the crowbar presented in U.S. Pat. No. 977,986 to Westley Waddel. This invention also provided two additional extensions to facilitate prying boards. This tool is an improvement over the previous few patents in that it consists of only one component which can be manufactured in a multi-stage progressive forging process.

U.S. Pat. No. 1,125,999 to Henry H. Frey describes the operation of a set of extending fulcrum slides carrying sighting marks and moving in dovetail slides. These fulcrum bars make contact with the working surface along sharp knife edges which will indent and damage wood surface. The mechanism consists of over fifteen parts which are independently manufactured.

Four rows of multiple claws are shown in U.S. Pat. No. 1,425,369 to Arthur Bertram Coleman. The claw sets are arrayed above each other and are used in extracting a nail gradually to prevent it from bending. The claws are reducing in size inwardly while in the U.S. Pat. No. 1,535,685 to Leon Osmond Randell and Reginald Harvey Raply two stacked claw sets reduce in size outwardly.

U.S. Pat. No. 1,664,594 to Charles D. Cummings provided a fixed independent fulcrum member along with several other modifications which may require two handed operation. Several components were also added in the U.S. Pat. No. 1,737,958 to John W. Carlson whose invention provided an automatically adjustable fulcrum. This hammer required the reproduction of internal serrations inside the support hole of the hammer-head. A trigger mechanism was also provided as well as a serrated fulcrum contact pad which may indent and mark-up wood surface.

A pivotable fulcrum element of channel-shaped cross-section was added to a conventional hammer-head in U.S. Pat. No. 2,231,206 to George Anderson. A locking and releasing knob is also specified which increases the number of moving components significantly. In addition, strength considerations at the pivot locking mechanism would require a very thick cross-sectional shape for the channel due to the excessive bending moments on the fulcrum element.

A modified hammer-head and a fulcrum attachment was shown in U.S. Pat. No. 2,553,102 to David McLean. This device required two-handed operation and the installation of two components in place prior to extracting each nail.

A four component hammer-head and a multi-component handle was described in U.S. Pat. No. 2,589,046 by Harvey H. Brown and Bert Ned Reed. An extensible fulcrum was installed internally to the handle. A similar, but simplified tool with a smaller number of components was described in U.S. Pat. No. 2,589,047 to Harvey H. Brown and Leland W. Williams. In both cases spring-loaded plungers were installed inside the handle to provide a retractable fulcrum.

A pivotable fulcrum element of channel-shaped cross-section and slotted support seats was presented in U.S. Pat. No. 2,643,854 to Ray W. Johnson. This eight-part tool required a different adjustment for each size of nail, two-handed operation, and multi-stage extraction of longer nails.

Another hammer with a retractable fulcrum plunger was described in U.S. Pat. No. 2,741,456 to Carl M. Williams. This tool consisted of more than fifty components and an integral, hollow, handle body.

U.S. Pat. No. 2,747,835 to Truly M. Belgard described an additional attachment for common claw hammers. This seven-component cam-shaped attachment is supported to a hammer for nail extraction, and removed for driving nails. The contact surface between the hammer and the attachment was to be custom-shaped to provide conforming mating and good support. This proposed customization process is an expensive process which may require extensive and accurate metal cutting by the end-user.

Another novel concept in nail extraction with hammers was presented in U.S. Pat. No. 3,150,858 to Vernon J. David. A modification insert was proposed for addition to common hammers making possible the extraction of nails in the direction perpendicular to the main claws. This insert is to be separately manufactured and attached to a hammer at the location of the neck of the anvil. The main design limitation of the insert is that it will only extract nails of length limited to one anvil diameter, or about one and a half inches long. The main manufacturing limitation of this invention is the expense of manufacturing ring-like inserts with internal and external details.

U.S. Pat. No. 3,543,821 to Roy Johnson discloses a hammer with a fulcrum extension which is also used for nail retention and guidance during driving of nails. This complex geometric extension cannot be forged because it carries internal threading and several concentric inserts which counter-support the nail. In addition, the fulcrum and the claws do not merge gradually. Similarly, U.S. Pat. No. 4,422,620 to Jerold I. Nitzberg disclosed a hammer with an adjustable fulcrum which can be retrieved internally to the handle through the action of a thread-driven stem.

A modified version of a claw hammer was disclosed in U.S. Pat. No. 4,533,116 to Vlatko Panovic. This tool provided a pivotable fulcrum cam attachment which can be engaged to assist with the extraction of nails. It can then be swiveled into a suitable pocket and stored away during driving of nails. The invention included some advanced features which help prolong the life of the hammer and the strength of the pivoted joint, but some assembly steps are required every time the hammer is used.

U.S. Pat. No. 4,998,996 to Jacques F. Belanger presents another activation mechanism for the concept of an adjustable fulcrum shared by many inventors. This tool provides for an adjustment knob which helps the end-user customize the hammer for a particular nail size. In addition, the inventor provided for a cushioned pad at the contact point of the fulcrum mechanism to prevent damage to wood surfaces.

A contoured extension for use as a fulcrum repositioning device was also claimed in U.S. Pat. No. 5,060,911 by Jerome J. Mikesell. This extension can be stored away, and used in the form of a handle extension when it is not needed as a variable fulcrum. Appropriate recesses and clamping means exist both at the hammer-head and the handle.

U.S. Pat. No. 5,249,776 to Ray W. Johnson shows a channel shaped sleeve which is installed on a common hammer-head to provide for an adjustable fulcrum point. This mechanism can be retracted to enclose the claws, or locked in an extended position to elevate the hammer and move the fulcrum point to a convenient location during extraction of nails.

The 25 U.S. patents listed above attempt to effectively relocating the fulcrum point, or the entire hammer-head, in order to improve the nail extraction process. They can collectively be classified into three categories:

a) hammers with multiple claws, b) hammers with fulcrum cams and other secondary components, and c) hammers with retractable fulcrum stems which are operated and stored inside the handle.

All three categories of proposed hammers have the common disadvantage of multiple moving components which increase the cost and complexity of manufacturing. Furthermore, some of the tools and components proposed cannot be manufactured at all with the hot and cold-working forging processes which would result in the required strain hardening of the anvil and the claws.

Over and above these two major flaws, hammers with multiple claws in category a) have the following specific disadvantages:

1) They cannot be used in some specific day to day tasks which are commonly performed in construction sites due to the fact that very little clearance is left between the claws and the handle. Some of these tasks are: prying stacked up boards, tearing boards, and prying heavy stones and plates.

2) The end-user would have to retrieve nails in multiple steps.

3) The additional claws add to the weight of the tool, making it impossible to provide small tools with adequate strength for use around the house.

4) The added weight at the claw-side shifts the center of gravity away from the junction of the hammer-head with the handle and causes static and dynamic instability during driving of nails.

Similarly, the specific tools in category b) of hammers with fulcrum cams have the following disadvantages:

1) Most tools require two handed operation.

2) Nails are in most cases extracted in multiple steps.

3) Some of these hammers require incompatible manufacturing processes which are not common in a fabrication facility. For example, manufacturing of cams requires sophisticated Computer Numerically Controlled machining or trace milling capabilities, while hammers are mostly manufactured with drop-forging and other bulk deformation processes.

4) Some secondary devices like cams and support channels are shown by their respective inventors to make contact with the work surface along a very small surface, thereby indenting and damaging the surface.

5) The intricacy of some cams and the delicate nature of support channels will tend to reduce their life in the harsh environments where hammers are used.

The last category includes various inventions where a movable fulcrum point is supported at the end of a stem. This fulcrum can be retracted inside the handle of the hammer. Each invention has a different driving mechanism and locking device for the moving stem, but all hammers have the following common disadvantages:

1) Very delicate mechanisms which may not withstand the high impact load generated during driving nails and tearing boards.

2) For each nail size the hammer needs to be adjusted, and for very lengthy nails the hammer may require two handed operation.

3) The retractable stem provides a movable fulcrum which reduces forces if extended within a very limited range. If the stem is extended beyond a certain upper limit, then the force required will increase instead of decreasing.

4) Jamming in threaded and ratcheted mechanisms will occur when the tools are used in dusty construction sites. Furthermore, the complexity and intricacy of the mechanisms involved is not compatible with the cleanliness conditions of most real working environments.

In short, most of the previous improvements to the common hammer were made under the presumption that tools do not have to be manufacturable in mass production lines, and if made, they do not have to be used in the common manner that hammers are used.

SUMMARY OF THE PRESENT INVENTION

In view of the foregoing disadvantages inherent in the known hammers available on the market and in the hammers proposed by various inventors, the present invention provides an improved nail extraction tool. As such, the principal object of the present invention, which will be described subsequently in greater detail, is to provide a new improved hammer-head for use on common hammers, crowbars, and levers which has most of the advantages of the prior art and none of the disadvantages.

It is another object of the present invention to provide a new and improved hammer-head which will facilitate the extraction of nails by minimizing the forces necessary, through the implementation of an optimal shape of the claw contour.

It is a further object of the present invention to provide a new and improved hammer-head which will facilitate the extraction of nails by minimizing the energy necessary, through the implementation of an optimal shape of the claw contour.

The synthesis of the above two optimal shapes of the contoured claws being determined through the implementation of two optimization techniques which can be solved with several theoretical or computer simulation methods like: variational calculus, exhaustive search, simulated annealing, steepest descent or ascent, simplex method, neural networks, and others.

It is a further object of the present invention to provide a new and improved hammer-head which is easily and efficiently manufactured and marketed.

Yet another object of the present invention is to provide a new and improved tool which is of reliable and durable construction.

An even further object of the present invention is to provide a new and improved hammer which is susceptible of low cost of manufacture with regard to both materials and labor, and which is susceptible of low prices of sale to the consuming public, thereby making such a tool economically available to the general public.

Still another object of the present invention is to provide a new and improved hammer which can be used by individuals of reduced muscular strength, like the elderly, women, and children.

Yet a further object of the present invention is to provide a new and improved hammer which can be manufactured and marketed as a family of products which can extract various sizes, or various types of nails. The size of each nail being used in deriving the boundary conditions or constraint equations during the solution of the governing equations of the optimization methodology implemented in minimizing forces or potential energy.

Still a further object of the present invention is to provide a new and improved hammer which can be used in prying stacked-up boards thereby possessing adequate clearance between the claws and the handle assembly for said boards to be accommodated. The numerical value of the clearance being used in deriving the boundary conditions or constraint equations during the solution of the governing equations of the optimization methodology implemented in reducing forces or potential energy.

An additional object of the present invention is to provide a new and improved hammer-head which can be used in driving nails very near a vertical wall without interference by ensuring tangency, or a controlled angle, between the tangent to the external convex surface of the anvil and the tangent to the claw contour at the location of their common intersection. The numerical value of the angle between the plane tangent to the claw contour and the plane tangent to the anvil external convex surface being used in deriving the boundary conditions or constraint equations during the solution of the governing equations of the optimization methodology implemented in reducing forces or potential energy.

Even still a further object of the present invention is to provide a new and improved hammer which can be used more effectively by carpenters and construction workers by minimizing the effort and time required in extracting nails.

Finally, an object of the present invention is to provide a new and improved hammer which can be used in leveraging and prying of large loads in conjunction with other tools and attachments to minimize the effort and risk associated with lifting of large loads.

These and other objects are accomplished through the design of two contoured claws possessing a shape specifically synthesized by the use of optimization methodology. A hammer-head having an integral anvil oriented tangential, or at a controlled angle, with respect to the pair of claws is supported on a handle which is either integrally manufactured or made of separate material than the head. An integral handle is either manufactured within the same bulk deformation process with the hammer-head, or at a later stage in the manufacturing process. A disassemblable handle can easily be replaced with a standard off-the-shelf wooden, metal, composite, or other handle and rigidly connected by mechanical means. The two contoured claws are separated by a major V-, or otherwise shaped, nail engagement notch. One, or both claws carry a secondary nail engagement notch at the free end for initial engagement of deeply immersed nails. A secondary optimal contour shape is tangential introduced at a small portion of the free end of one claw where a secondary notch is present. This secondary optimal contour shape is only capable of extracting nails by a small distance to facilitate the engagement of nail heads in the major notch.

There has thus been outlined, rather generally, the more important features of the optimal hammer-head in order for the detailed description thereof to be better understood, and in order that the present contribution to the art may be better appreciated. There are, of course, additional features of the present invention that will be described hereinafter and which will form the subject matter of the claims appended hereto. In this respect, before explaining the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying our several purposes of the present invention. It is important, therefore, that the claims be regarded as including such equivalent constructions insofar as they do not depart from the spirit and scope of the invention.

BRIEF DESCRIPTION OF THE DRAWINGS

The foregoing objects and advantages of the present invention for a new and improved hammer-head will be more readily understood by one skilled in the art by referring to the following detailed description of a preferred embodiment and the accompanying drawings which form a part of this disclosure, and wherein.

DETAILED DESCRIPTION OF A PREFERRED EMBODIMENT

Figure 1:
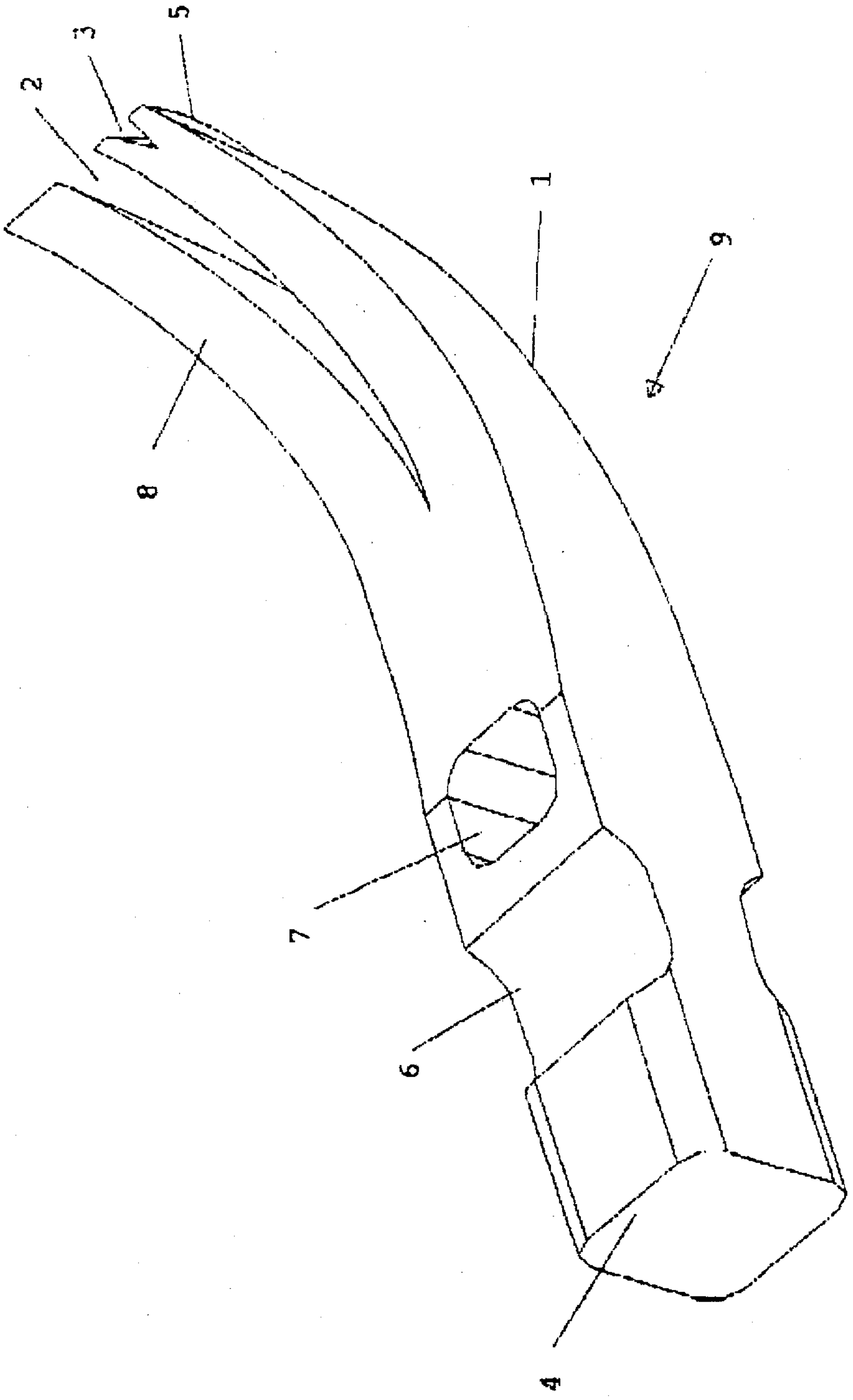
FIG. 1 is an isometric view showing a new and improved hammer-head.

Referring to the drawings for a clearer understanding of the present invention, it should be noted in FIG. 1 that the optimum hammer-head which is the subject of this application, is shown generally at 9 and indicates the use of a single piece or metal which is appropriately shaped by one of many manufacturing processes. The main head can be machined from a metal plate and then properly heat treated. It can also be produced with an integral handle, or equipped with standard, or custom-built handles. Both the hammer-head and the handle, whether integral or detachable, may also be produced from various types of engineering materials like high-impact plastics, composites, and others. It can also be produced in the form or a plastic, wooden, or rubber carpenter's mallet and reinforced in critical locations with stronger materials. The main hammer-head can also be produced from multiple pieces and assembled into various sizes or types. Furthermore, it can be equipped with different accessories, or produced with several integral extensions for use as a crowbar, or as a weight lifting aid. As shown in FIG. 1, the hammer-head is comprised of an anvil 4, a neck 6, a mounting hole 7, and a pair of claws 8. The exterior convex contour 1 of the claws 8 is optimized through the appropriate application of energy minimization, or force minimization techniques. As shown in FIG. 1, the secondary notch 3 may be formed on one of the two claws, and the same claw further shaped according to a secondary optimal curve 15 which is appropriate for initial extraction of a nail by a small distance to facilitate the engagement of the nail into the primary notch 2 and the complete extraction. The optimal hammer-head can also be produced without the secondary notch 3 and the secondary optimal curve 5 to further simplify manufacturing procedures, or to provide a more economical alternative.

Figure 2:
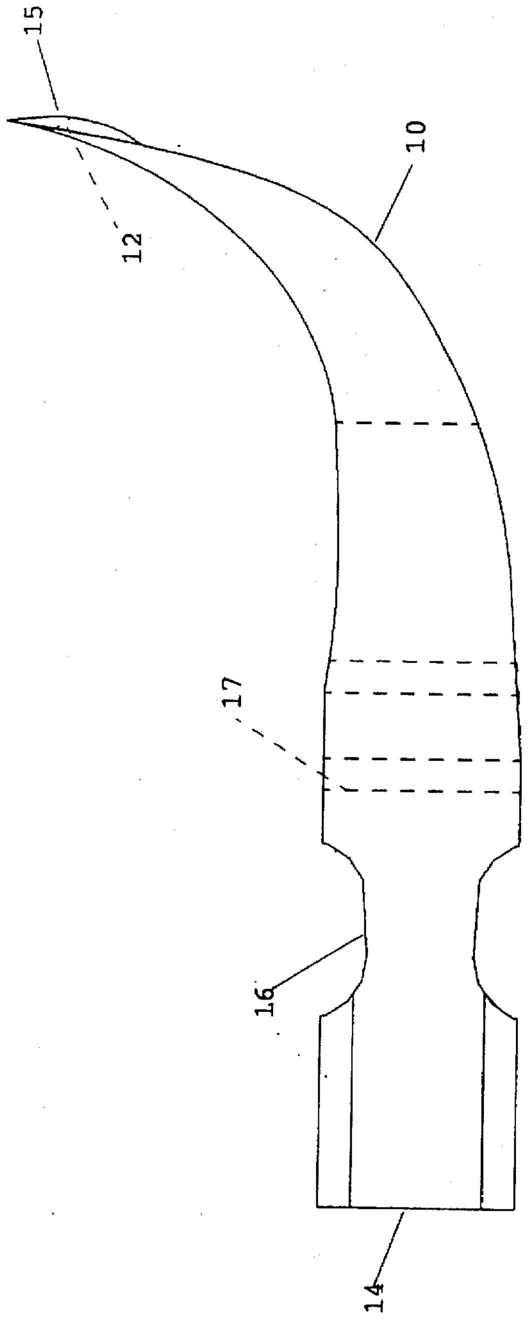
FIG. 2 is a side view of the new and improved hammer-head.

In even greater particularity, as shown in FIG. 2, the anvil 14 can be produced with a squared face. It can also be produced with a rounded face. Similarly the neck may be formed by semicircular cuts 16, triangular notches, or rectangular notches. Also, the mounting hole 17 is optional and only necessary in hammers where the handle is not integrally produced on the optimal hammer-head.

Figure 3:
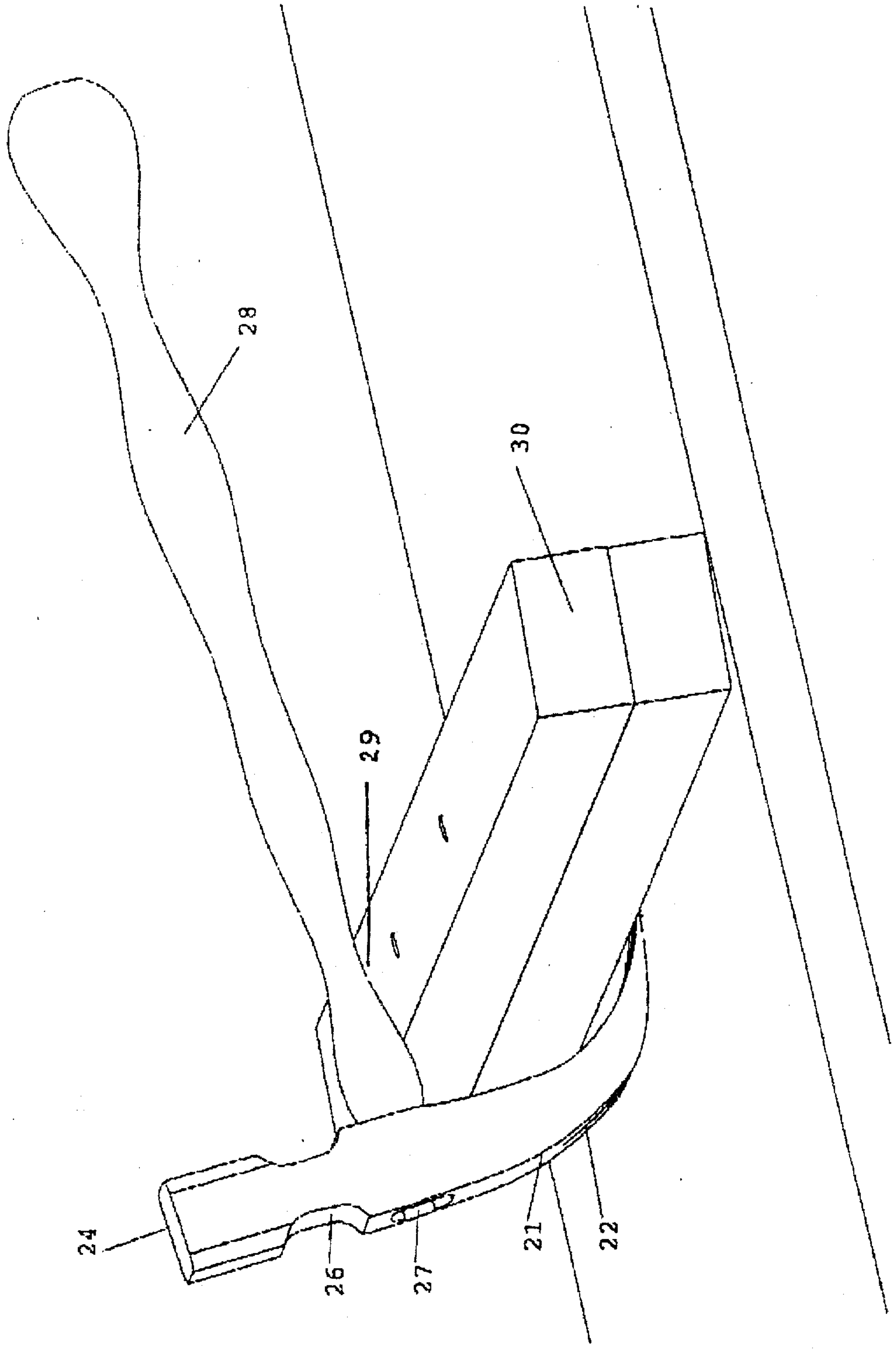
FIG. 3 is an isometric view of a hammer carrying the new and improved hammer-head as it is engaged in prying two stacked-up boards.

As depicted in FIG. 3, the contoured exterior shape 21 of the claws 22 is such that adequate space is allowed between the handle 28 and the claws to accommodate the two stacked-up boards 30. The size of the gap 29 is one of the boundary conditions used in the derivation of the governing equations of the two optimization methodologies, and can be varied according to the purpose of the specific optimal contour.

The most critical element of the optimal hammer-head is the curve which defines the contoured exterior shape 21 of the claws. Two alternative methodologies are used in the present invention for the derivation of optimal curves. The first methodology is based on the minimization of the energy spent in exercising the pulling forces. The characteristic of the family of curves produced by the implementation system of this methodology may result in high values of pulling forces but the period of time over which they are applied is small. The second methodology is based on the direct minimization of the pulling forces. The characteristic of the curves produced by the implementation system of the force minimization methodology is that they allow the user to exercise the smallest possible forces, but these forces may be required over an extended period of time.

Figure 4:
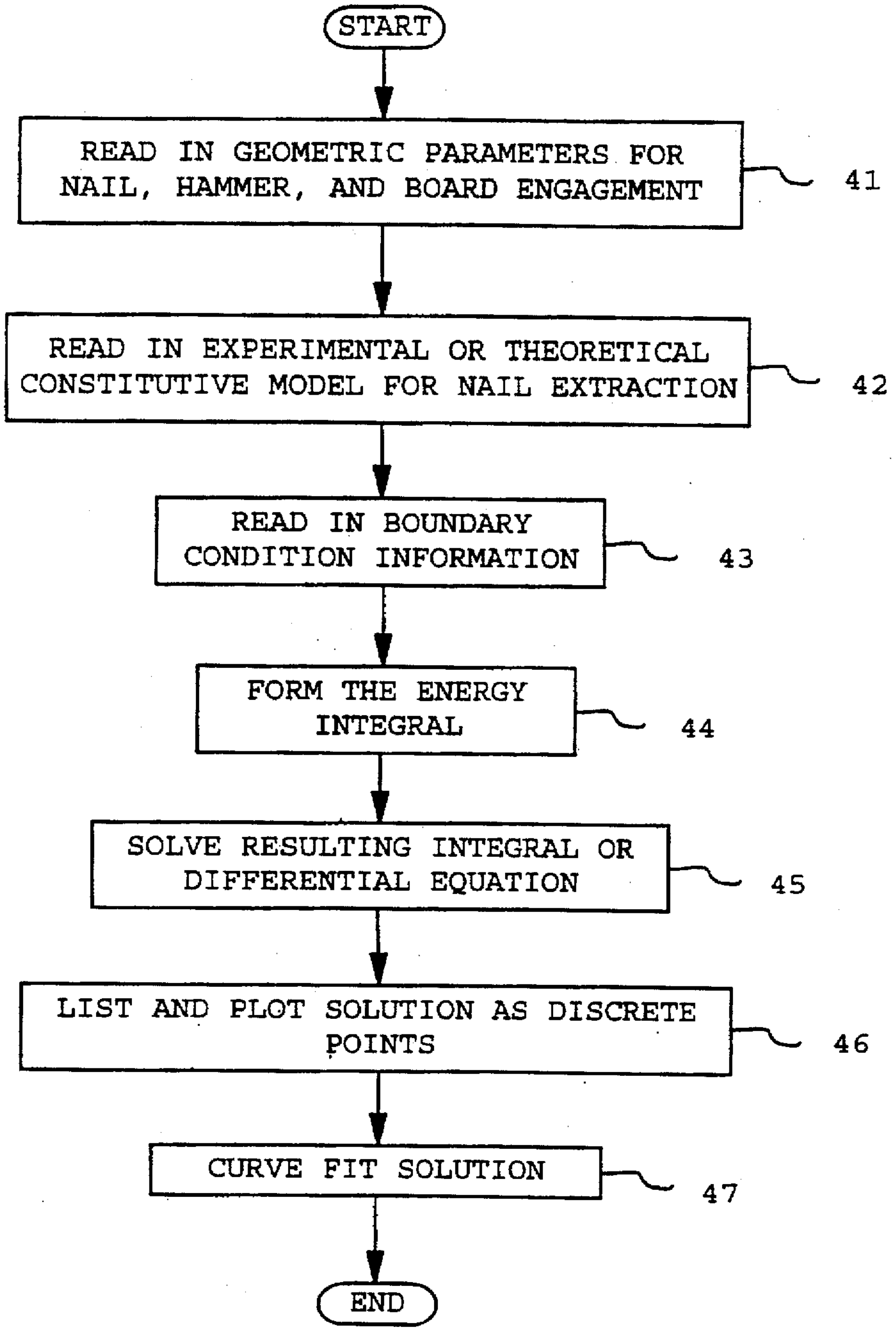
FIG. 4 is an example flow chart of a computer program which determines a claw contour which results in minimum energy during nail extraction.

The system for the implementation of the optimization methodology based on minimization of the extraction energy is shown in FIG. 4. This system is used in the synthesis of contours which will be used in the design of claws for hammers, crowbars, and levers which will result in a minimal amount of energy spent in exercising forces. The present energy minimization system is comprised of an initial information reading section 41, a nail extraction constitutive model selection section 42, a conversion section 43 responsible for extraction of boundary conditions from initial information and theoretical or experimental nail extraction constitutive models, a governing differential equation definition section 44, a solution section 45 which implements the Range Kutta, or other numerical solutions technique for the solution of the governing differential equations, a listing and plotting section 46 and a curve fitting section 47 for improved visualization.

Figure 5:
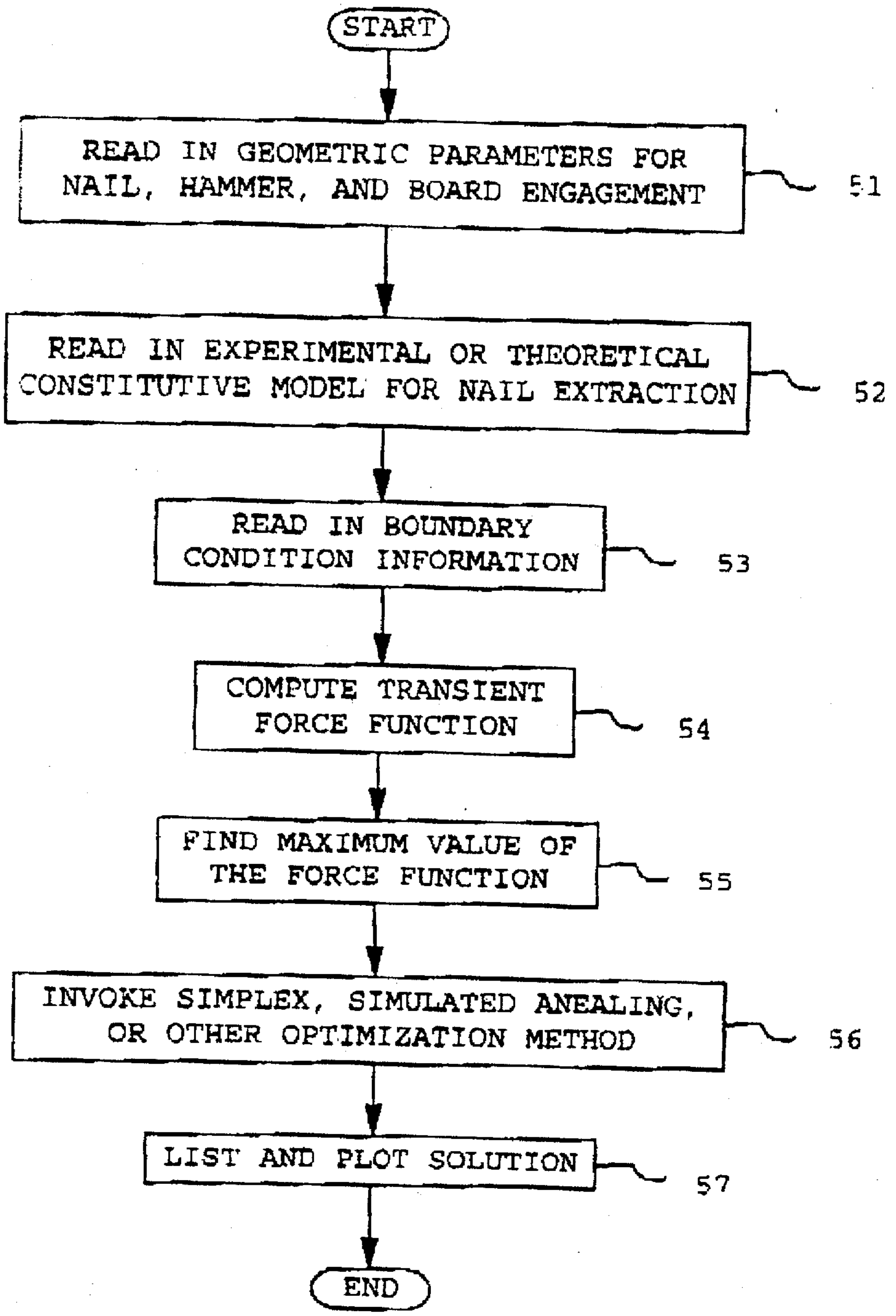
FIG. 5 is an example flow chart of a computer program which determines a claw contour which results in a minimum force level during nail extraction.

The second system for the implementation of the optimization methodology based on minimization of the extraction forces is shown in FIG. 5. This force minimization system is comprised of an initial information reading section 51, a nail extraction constitutive model selection section 52, a conversion section 53 responsible for extraction of boundary conditions from initial information and theoretical or experimental nail extraction constitutive models, a section 54 where the transient force function is computed, a section 55 where the maximum value encountered in a transient force function is selected, a section 56 where the exhaustive search, simplex, steepest ascent and descent, simulated annealing, or other optimization technique, is implemented, and a listing and plotting section 57. Several exhaustive search methods are allowed in section 56. Some methods use spline fitting through moving end-points, some use spline fitting with variable ending-conditions, and some utilize square and triangular grids.

Figure 6:
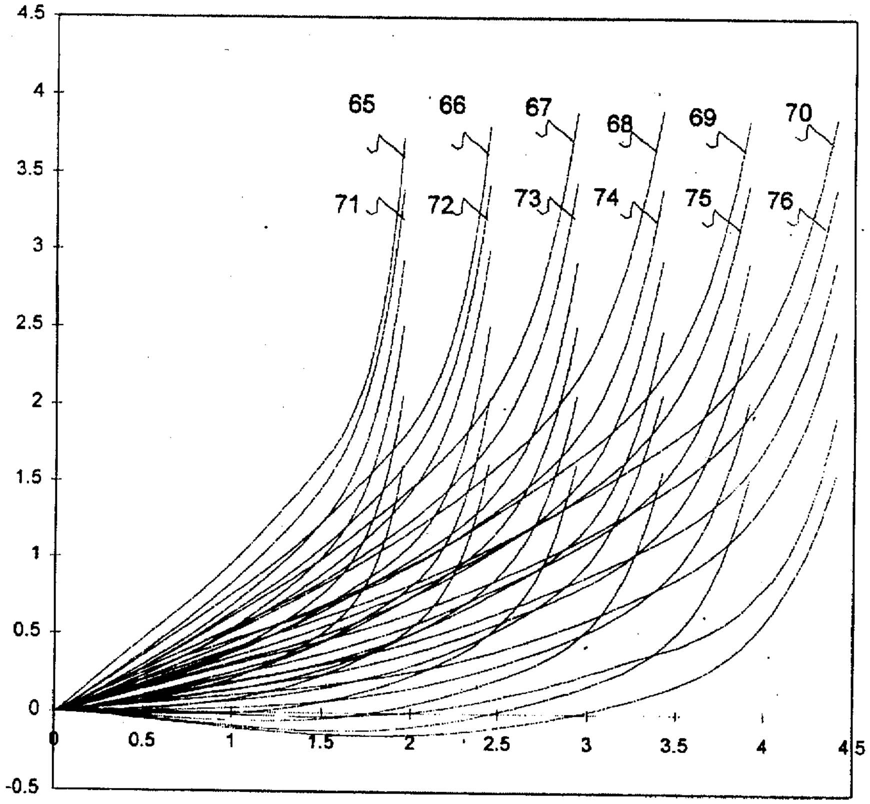
FIG. 6 is a side view of several contours for use as claw shapes for minimization of energy or forces for extraction of nails of various sizes. This figure also illustrates the exhaustive search and simplex optimization methods.

Several contours for use in designing optimum hammer-heads for extraction of various sizes of nails are shown in the example set of plots illustrated in FIG. 6. The vertical axis with respect to which the geometry of these contours is defined passes through the centerline of the handle, and the horizontal axis is parallel to the surface on which nails are immersed. In the particular set of boundary conditions used in this example synthesis procedure all contours indicate tangency with the horizontal axis at the origin 86 of the coordinate system. Example curves 65, 66, 67, 68, 69, and 70 are suitable for extraction of nails having the same length, but allow a steadily increasing gap between the claws and the handle. Also notice that curves 71, 72, 73, 74, 75, and 76 are also suitable for extraction of nails having the same length. The performance of curve 71 when compared to curve 65 is better, thereby requiring smaller forces, but the range of nails it can fully extract is smaller.

Additional advantages, modifications, special cases, and extensions will readily occur to those skilled in the art. Therefore, the invention in its broader aspects is not limited to the specific details, physical devices, boundary conditions, solution methodologies, and illustrated examples shown and described herein. Accordingly, various modifications may be made without departing from the spirit and scope of the general inventive concept as defined by the appended claims and their equivalents.

Having set forth the nature of the present invention, What is claimed is:

1. An optimization method for generating and displaying contoured curves comprising the steps of:

a) receiving input information in the form of physical requirements, said physical requirements corresponding to dimensions and tangency conditions of common hammers, crowbars, and levers;

b) analyzing values of the dimensional requirements and tangency conditions and deriving boundary conditions;

c) receiving information on theoretical or experimental constitutive models of nail extraction forces;

d) deriving energy minimization governing differential equations, based on constitutive equations and engagement conditions between contoured hammer-claws shaped according to optimal curves, by use of variational calculus or exhaustive search methods;

e) solving numerically governing differential equations and applying boundary conditions; and f) listing and graphically displaying curves and providing data points for the design of hammers, crowbars, and levers requiring minimal energy for the application of pulling forces.

2. An optimization method for generating and displaying contoured curves comprising the steps of:

a) receiving input information in the form of physical requirements, said physical requirements corresponding to dimensional requirements and tangency conditions of common hammers, crowbars, and levers;

b) analyzing values of dimensional requirements and tangency conditions and deriving boundary conditions;

c) receiving information on theoretical or experimental constitutive models of nail extraction forces;

d) deriving transient force curves based on constitutive equations and engagement conditions between contoured hammer-claws shaped according to optimal curves;

e) maximizing transient force curves and invoking simplex, exhaustive search, steepest ascend or descend, simulated annealing; and f) listing and graphically displaying said curves, and providing data points for design of hammers, crowbars, and levers requiring minimum peak force for extraction of nails and lifting of weights.

3. A general purpose hammer-head comprising:

a) a general purpose anvil, integrally, connected to said hammer-head;

b) a standard handle, integrally connected to said hammer-head;

c) at least one set of common nail extraction claws, said claws shaped according to design data provided by methods defined in claim 1 or 2;.

d) said nail extraction claws oriented tangentially, or at another desirable angle with respect to said general purpose anvil;

e) a primary notch separating said claws and facilitating engagement of nails for complete extraction;

f) at least one optional secondary notch at the end of one of said claws on the optimal hammer-head; and g) one or more optional secondary contour shapes at the location of said secondary notch to facilitate initial minor extraction of deeply immersed nails.

4. An optimized hammer-head design methodology as defined in claim 1 or 2 enabling the design of families of interchangeable hammer-heads for the removal of nails with minimum forces or minimum energy required.

5. An algorithm and a system implementing the optimization methodologies defined in claims 1 or 2 and a design methodology enabling the design of families of interchangeable hammer heads for the removal of nails with minimum forces or minimum energy required, said system resulting in design charts, or electronic files containing information used in the manufacture of hammer-heads.

* * * * *